Oct. 8, 1946.   C. W. FREDERICK   2,408,923
TRAP FOR CHIPS
Filed Feb. 12, 1945
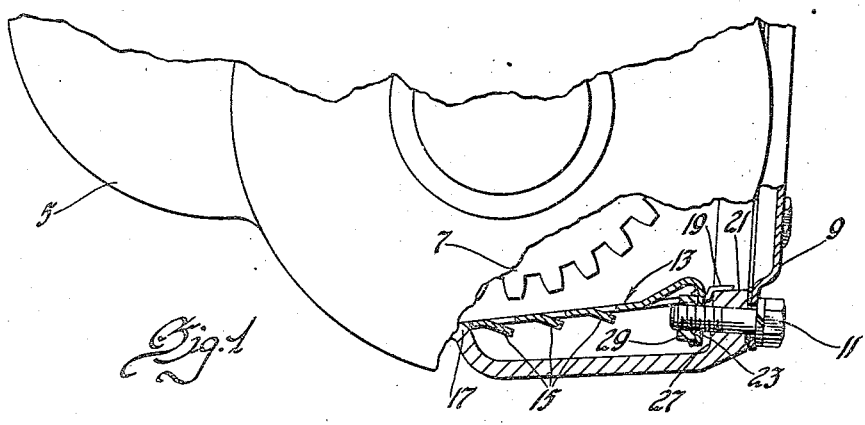
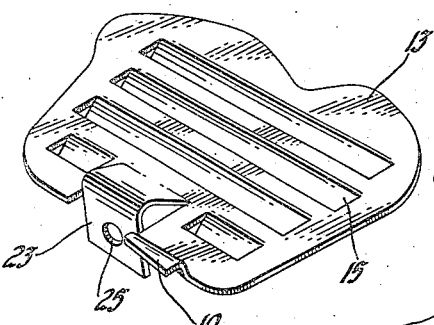
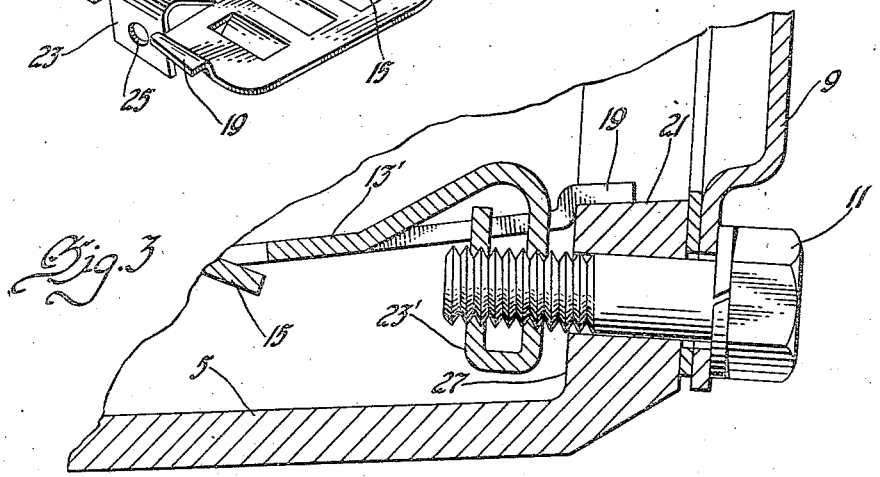
Inventor
Charles W. Frederick
By Blackmor, Spencer & Flint
Attorneys Patented Oct. 8, 1946

2,408,923

UNITED STATES PATENT OFFICE 2,408,923

TRAP FOR CHIPS

Charles W. Frederick, Muncie, Ind., assignor to General Motors Corporation, Detroit, Mich., a corporation of Delaware Application February 12, 1945, Serial No. 577,443

2 Claims. (Cl. 74—606)

In spite of the exercise of care foreign matter is likely to collect in the transmission housing of a motor vehicle. Particles may be left in the casing in the process of manufacture; small bits may be chipped off the gears; and the lubricating medium, when supplied, may contain some foreign particles.

The principal object of this invention is to trap such "chips," using the word to include all particles from whatever source, which may be present in the casing. Other objects include simplicity and economy in the accomplishment of the major object.

The invention is illustrated in the accompanying drawing in which:

Fig. 1 is a view of an engine transmission housing in elevation, partly broken away and in section to show the novel trap.

Fig. 2 shows the trap by itself in perspective.

Fig. 3 is a view corresponding to Fig. 1 but showing what is now regarded as a preferred form of attachment.

Referring by reference characters to the drawing, numeral 5 is used to indicate a gear of transmission housing. At 7 is shown one of the gears by which power from the engine and clutch is transmitted to the driving wheels. The specific details of the gearing for effecting the desired driving ratios are not shown since they form no part of the invention. At the right there is shown a cover 9 held to the casing by bolts of which one is marked 11. The removable cover is not a part of the invention. It may be used to give access to power take off mechanism within the gear box.

The expedient for trapping chips is a plate 13. It is positioned near the bottom wall of the housing. Plate 13 has tongues 15 bent down from the plate forming louvers. There are several of these louvers each formed by cutting out three sides of an elongated rectangular outline and bending down the tongue. The long dimension of the tongue, when the trap is assembled, is lengthwise of the housing. Since the plane of the overlying gear 7 is disposed transversely of the housing the gear rotation forces the oil through the louvers and its return is prevented.

One edge of the plate rests on a bottom casing wall at 17. The opposite edge has a flange 19 to rest on a casing face 21. Adjacent flange 19 there is an angular tongue 23 having an aperture 25. This tongue is normally out of parallelism with the adjacent face 27. A nut 29 is welded to the tongue 23 and as the bolt 11 is turned through the nut it straightens the tongue into more nearly parallel relation with face 27 and in consequence the end 17 is held firmly in contact with the casing. In this way the bolt 11, already present in the casing, serves by itself to hold the trap in position.

In a preferred form for attaching a trap 13', the form shown by Fig. 3, the nut is not used. A longer tongue 23' is used. The longer tongue is made into U form and the bolt is turned through both branches of the U which thus serves both as a nut and a lock nut for holding the trap in position.

By the above expedient there has been provided a trap to collect chips, a trap which is effective to collect foreign matter and one which is comparatively inexpensive and readily applied.

I claim:

1. In a transmission gear casing having a gear therein, a chip trap beneath said gear, said trap being a plate having louvers extending at right angles to the plane of said gear whereby gear rotation forces chips through said louvers and the trap retains them beneath said plate, said plate having a U-shaped tongue, a bolt extended through a wall of said casing and through both branches of said tongue to hold the plate in position.

2. In a transmission gear casing having a gear therein, a chip trap beneath said gear, said trap being a plate having louvers extending at right angles to the plane of said gear whereby gear rotation forces chips through said louvers and the trap retains them beneath said plate, said plate having a bent tongue, a nut welded to said tongue and a bolt extending through a wall of said casing and through said nut.

CHARLES W. FREDERICK.